(12) United States Patent
Bauermeister et al.

(10) Patent No.: US 9,360,942 B2
(45) Date of Patent: Jun. 7, 2016

(54) CURSOR DRIVEN INTERFACE FOR LAYER CONTROL

(71) Applicant: Door Number 3, Seattle, WA (US)

(72) Inventors: Benjamin P. Bauermeister, Port Townsend, WA (US); Neil A. Flagg, Port Townsend, WA (US)

(73) Assignee: Door Number 3, Seattle, WA (US)

( * ) Notice: Subject to any disclaimer, the term of this patent is extended or adjusted under 35 U.S.C. 154(b) by 296 days.

(21) Appl. No.: 13/898,314

(22) Filed: May 20, 2013

(65) Prior Publication Data

US 2013/0321457 A1 Dec. 5, 2013

Related U.S. Application Data

(60) Provisional application No. 61/649,759, filed on May 21, 2012.

(51) Int. Cl.

| | |
|---|---|
| G09G 5/14 | (2006.01) |
| G06F 3/01 | (2006.01) |
| G09G 5/377 | (2006.01) |
| G06F 3/14 | (2006.01) |
| G06F 3/0488 | (2013.01) |

(52) U.S. Cl.
CPC .............. *G06F 3/017* (2013.01); *G06F 3/0488* (2013.01); *G06F 3/04883* (2013.01); *G06F 3/1462* (2013.01); *G09G 5/377* (2013.01); *G09G 2370/022* (2013.01)

(58) Field of Classification Search
CPC ....................................................... G06F 3/017
USPC ......................................................... 345/629
See application file for complete search history.

(56) References Cited

U.S. PATENT DOCUMENTS

| | | | |
|---|---|---|---|
| 6,515,656 B1* | 2/2003 | Wittenburg et al. | 345/418 |
| 8,368,720 B2* | 2/2013 | Peterson | 345/629 |
| 8,659,622 B2* | 2/2014 | Dhawan | 345/626 |
| 8,731,973 B2* | 5/2014 | Anderson et al. | 705/4 |
| 9,001,230 B2* | 4/2015 | Jirman | 348/222.1 |
| 2004/0044732 A1* | 3/2004 | Fushiki et al. | 709/205 |
| 2007/0198534 A1* | 8/2007 | Hon et al. | 707/10 |
| 2010/0053342 A1* | 3/2010 | Hwang et al. | 348/207.99 |
| 2011/0202859 A1* | 8/2011 | Fong | 715/769 |
| 2012/0206471 A1* | 8/2012 | Sarnoff et al. | 345/581 |
| 2014/0254946 A1* | 9/2014 | Culpepper et al. | 382/224 |

* cited by examiner

*Primary Examiner* — Javid A Amini
(74) *Attorney, Agent, or Firm* — Hogan Lovells US LLP

(57) ABSTRACT

An approach for manipulating objects within a document whereby one or more objects are transposed between other objects in a display order. A first element of the plurality of elements is selected as the active element and a display interface is associated with the first element, and based on input received with respect to the interface element, the display order of the first element is changed in relation to the plurality of elements.

20 Claims, 13 Drawing Sheets

400

500

Symbol Set for Action Symbols

| | | | |
|---|---|---|---|
| 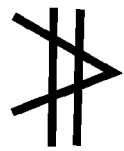 | To Do<br>A task assigned to<br>the <owner> | 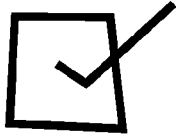 | Task Completed<br>Recorded task by a<br><name/list> |
|  | Delegated<br>A task assigned to<br>a <name/list> |  | To Email<br>A <topic>,<br>A <name/list>,<br>A <date> |
|  | Assigned<br>A task assigned to<br>a <name/list> | 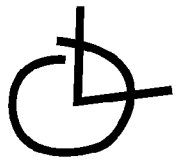 | To Meet<br>A <topic>,<br>A <location>,<br>A <name/list> |
|  | To Call<br>A <topic>,<br>A <name/list>,<br>A <date> | 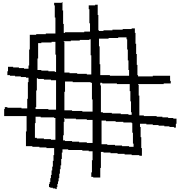 | Date<br>A <date> |
|  | Topic<br>A <topic> |  | Name<br>A <name> |
| 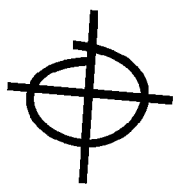 | Location<br>A <location> |  | Name List<br>A <name/list> |

FIG. 5

CURSOR DRIVEN INTERFACE FOR LAYER CONTROL

CLAIM OF PRIORITY AND RELATED APPLICATION DATA

This application claims priority to U.S. provisional patent application Ser. No. 61/649,759, filed May 21, 2012, the contents of which are hereby incorporated by reference for all purposes as if fully set forth herein.

This application is related to U.S. patent application Ser. No. 13/898,318, filed on May 20, 2013, entitled "Common Drawing Model", by Benjamin P. Bauermeister et al., the contents of which are hereby incorporated by reference for all purposes as if fully set forth herein.

BACKGROUND

The growth of the Internet and high-speed network connections has enabled the proliferation of collaborative document creation and modification. Multiple users are able to create, view, edit and comment on a single document, often in real-time. While text documents are particularly well suited to these shared collaborative models, documents such as drawings, graphs, pictures and other graphical elements have characteristics that do not lend themselves to online collaboration.

Graphical documents, by their nature, require exact replication of shapes, lines, colors and constituent elements. A drawing created on one device may look drastically different when viewed on another device with a different display resolution, different color depth, different screen size and the like. If the juncture of two lines is displayed differently on two devices, even being offset by a tiny amount, the entire drawing will be compromised.

Graphical documents often contain numerous layers of graphic objects, which may be difficult to manipulate with a pointing device, such as a mouse or fingertip in the case of a touchscreen device.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 5 is an illustration 500 of sample action symbols and their associated actions according to an embodiment;

DETAILED DESCRIPTION

Figure 1A:
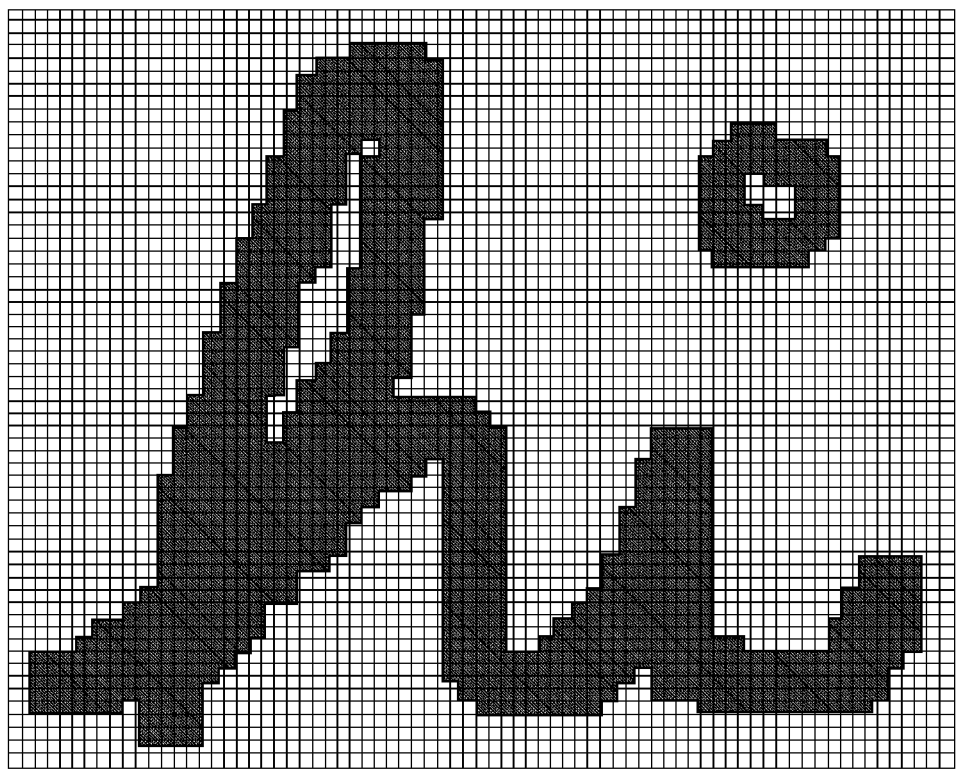
FIG. 1A is an illustration illustrating a raster image according to an embodiment.

Approaches for devices, methods and software for providing a centralized, shared, collaborative, online drawing environment and the related infrastructure, data structures, drawing models, and user interface elements and approaches are described. In the following description, for the purposes of explanation, numerous specific details are set forth in order to provide a thorough understanding of the embodiments described herein. It will be apparent, however, that the embodiments described herein may be practiced without these specific details. In other instances, well-known structures and devices are shown in block diagram form in order to avoid unnecessarily obscuring the embodiments described herein.

Functional Overview

Embodiments of the approaches described herein may comprise displaying a plurality of elements wherein the elements are stacked in a display order, and causing a first element (or multiple elements) of the plurality of elements to be selected as the active element. Then, an interface element (such as a handle) associated with the first element is displayed, and based on input received with respect to the interface element, the display order of the first element is changed in relation to the plurality of elements.

Other embodiments may comprise determining the speed at which the interface element is being adjusted and adjusting the speed at which the display order of the first element is visually presented based on the speed at which the interface element is being adjusted. Additionally, the speed at which the display order is visually presented may be modified based upon the proximity of the first element to either the bottom or top of the display order and/or the proximity of the first element to its original place in the display order.

In an embodiment, the speed at which the display order is visually presented slows down as the first element approaches either the bottom or top of the display order.

Shared Raster for Collaborative Drawings

Embodiments are directed toward techniques for providing a single, shared and centralized raster whose true image is held by a service, not by any single client. The term "client," as broadly used herein, represents any type of Internet end-point or computer system capable of connecting to a network. Non-limiting, illustrative examples of a client for the purposes of this disclosure include a PC, a laptop computer, a tablet computer, a cell phone, a personal digital assistant (PDA), Social Networking platforms such as Facebook, and the like.

In an embodiment, a client may correspond to a server. Thus, while use of the term "client" in other contexts might exclude an interpretation that includes a server, as broadly used herein, "client" may be embodied on a wide variety of machines, one example of such being a server. Thus, as the Applicant may be his or her own lexicographer, as used herein, the term "client" expressly includes a server. For example, non-limiting, illustrative examples of clients include a web server, an application server, a file server, and a cloud server.

An effective shared collaborative drawing model requires that all collaborators (alternate terms for "collaborators" herein may be "users" or "viewers" or "clients") see and modify the exact same image of a drawing in real time. While the term "drawing" will be used herein to generically refer to a shared document as contemplated by the approaches described herein, it should be understood that the approaches are not limited to any particular document type or file type and may contain both graphical and textual elements combined in a graphical presentation of those elements.

Obstacles to an effective shared collaborative drawing model include users' viewing devices having different characteristics such as resolution, color depth, screen size and the like, as well as differences introduced by different operating systems, applications, network communication methods, network transmission speeds, etc. Another difficulty in providing a shared collaborative drawing model is the need for perfect synchronization wherein each individual user's version of the drawing to be shared must be identical to the other members of the group of users taking actions on the drawing such as viewing, commenting or modifying the drawing.

By providing a single, shared and centralized raster format of a drawing, each user may view an exact replica of the group's combined efforts at the same time. Sharing a drawing according to the techniques described herein is accomplished, according to an embodiment, by formatting the drawing in an acceptable manner and providing for the transmission, synchronization and storage of the drawing.

In one embodiment, an acceptable format for a drawing as contemplated by the techniques described herein is a raster image. A raster image comprises a collection of dots in a grid. According to one definition, a raster graphics image (or bitmap image) is a data structure representing a generally rectangular grid of pixels, or points of color, viewable via a monitor, paper, or other display medium. A raster image is a primitive format capable of being rendered by any device with the exact same results as any other rendering device or implement. While scale or magnification may vary between rendering clients, the overall appearance of the raster image will remain true to its source.

FIG. 1A illustrates a raster image wherein certain pixels are "turned on" and the resultant image displays a cursive "hi." This is one example of a raster image supported by embodiments of the approaches described herein.

While attributes of a raster image, such as the total count of dots (or pixels) in each row, the number of columns, and the depth of each pixel (mono, grey, color) may vary between drawings, as long as these attributes are shared in common across clients attempting to interact with the raster image and each client acts on these attributes in a consistent fashion, a raster image may be utilized by the approaches described herein as a suitable format for a shared drawing in a collaborative environment.

While the mathematics for rendering curves, or laying out type, or filling shapes, cornering line intersections, and fading gradients may vary from device to device (and browser to browser, and operating system to operating system), the interpretation of a raster is sufficiently concrete in order to guarantee uniform display across clients.

According to an embodiment, sharing this raster across a group of collaborators is accomplished by utilizing a central repository (the "service"), such as a server, to coordinate changes made by each user to the drawing into a single version rather than attempting to synchronize the changes between the various contributors to the shared document. In this way, the central single copy becomes the master version, or single "truth," for each of the client devices or remote editing platforms, and each client's version of the drawing is simply an ephemeral snapshot mirroring the central server's combined collection of all instantaneous changes.

According to an embodiment, each change to a drawing made by a user is rendered into a raster on the user's device. The changed areas of the raster are then transmitted to the service. The service updates the central image with the received raster changes. Notifications go out to each of the other connected clients that new raster changes have occurred. Alternatively, each client may ask the service on a frequent and periodic basis, referred to as 'polling', if there are new changes to the raster. Each client then requests an update to their local version to remain current. The benefits of high speed networks, capable of sending 30 frames of HD content per second, allows for the seemingly real time interaction of collaborative drawing in a magical live animation.

Figure 1B:
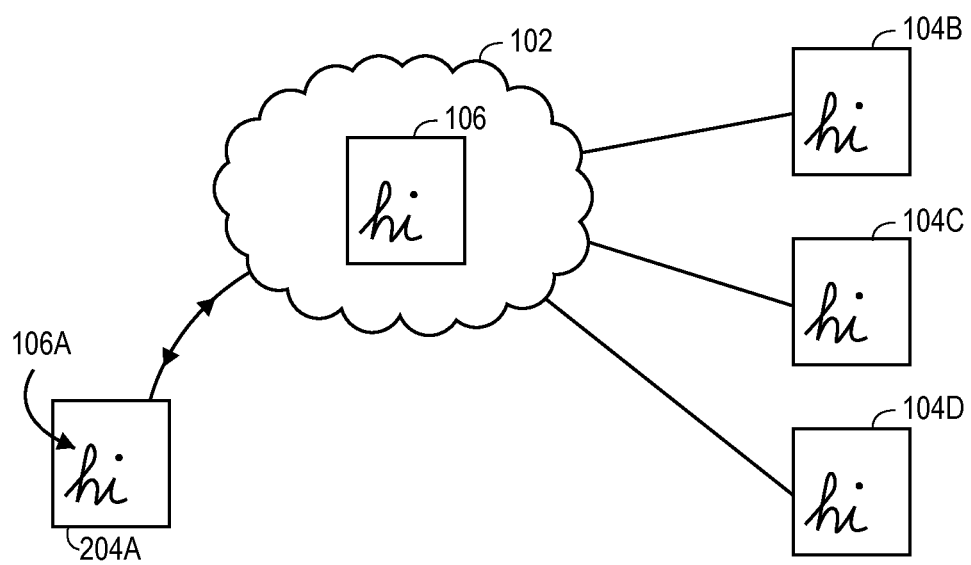
FIG. 1B is an illustration 100 illustrating an example approach for sharing a raster according to an embodiment.

Referring to FIG. 1B, which is an illustration 100 illustrating an example approach for sharing a raster according to an embodiment, the service 102 is implemented as a "cloud service," which in general terms is a service provided over the Internet, such as through an application running on a server accessible by clients. In the example of FIG. 1B, a raster image 106, such as illustrated in FIG. 1A above, is stored on cloud service 102. In this example, raster image 106 comprises a drawing on which several users 104A-D are collaborating. The raster image 106 is sent from cloud service 102 to client 104A, who modifies the raster in some way. The modified raster 106A is transmitted to the central cloud service 102, for example automatically after the modifications are complete or incrementally as changes are made. The threshold at which a decision is made regarding when to transmit the modified raster is configurable. Once the modified raster 106A is fully transmitted to cloud service 102, the version of the raster 106 originally stored on cloud service 102 is updated with the new version 106A. In an embodiment, versions of the raster image 106, 106A may be stored on cloud service 102 for later recovery or rollback.

After the newest version of the raster image 106A is stored on cloud service 102, notification of the change to the raster image 106 are sent to all clients 106A-D configured to receive them. This notification may be implemented through any suitable messaging protocol. As a result of receiving the notification, the non-modifying client's 106B-D send a request for the latest raster image version 106A from cloud service 102. This may be automatic or manually triggered and take place within a particular application executing on a client device or as a separate notification, for example at the operating system level. As a result of the request for the updated raster image 106A, it is transmitted to the requesting client devices 106B-D.

This central service has the benefit of allowing for low frequency or asynchronous connections (such as times when collaborators may not be present) and thus providing storage for the current up-to-date drawing. At any point in time a client can connect to the service, request the current state of the drawing, make modifications to it, and return it, regardless of whether there are other clients actively working on the document or not.

All changes are handled in real time based on network connectivity with the service acting as the central authority, so that conflicts can be prioritized by "first in" priority. Other conflict resolution approaches are envisioned.

Figure 2:
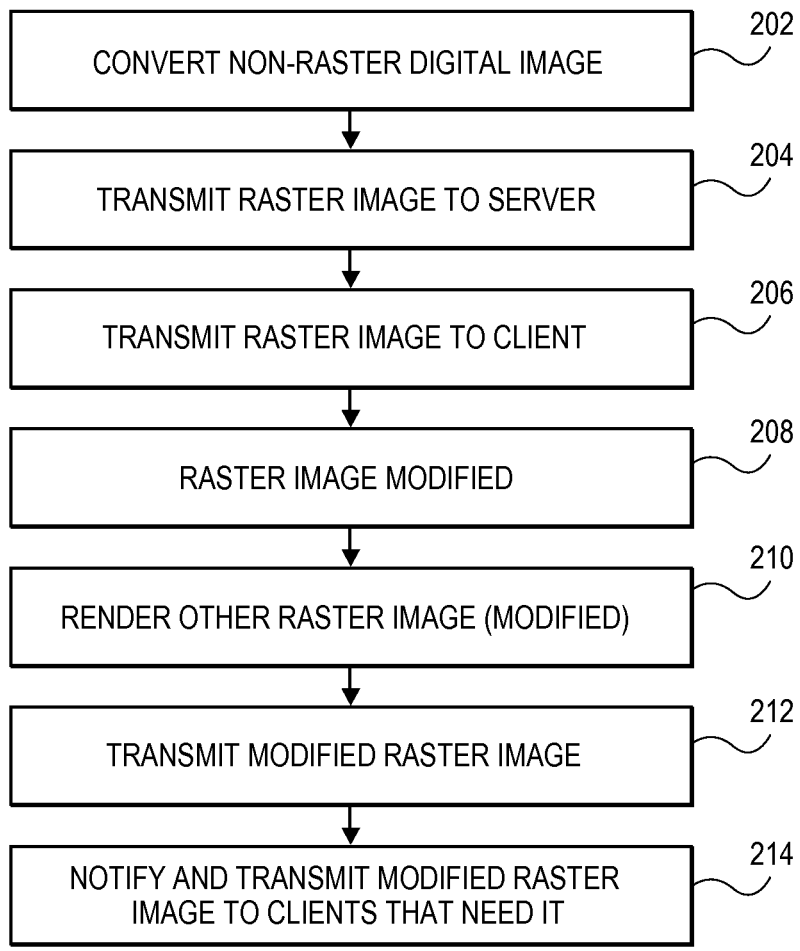
FIG. 2 is a flow diagram 200 illustrating an example approach for sharing a raster according to an embodiment.

FIG. 2 is a flow diagram 200 illustrating an example approach for sharing a raster according to an embodiment. In some implementations, the approach 200 can include fewer, additional and/or different operations. In other examples, only one or some subset of these operations may be included, as each operation may stand alone, or may be provided in some different order other than that shown in FIG. 2.

At 202, a non-raster digital image is converted into a raster image, for example on a client device. In certain embodiments, the digital image may comprise a bitmap image, a vector image, a block of text, or any other type of drawing or digital file that can be displayed on a display. In some embodiments, the conversion may be done at the client by a local process, or may be transmitted to another computing device for the conversion and re-transmitted to the client. In an embodiment, this step is not needed because the image is already a raster image.

At 204, the raster image is transmitted from the client to a server, for example a cloud computing environment, where the raster image is stored.

At 206, the raster image is transmitted from the server to at least one other client, where the image may be displayed.

At 208, one of the other clients modifies the raster image; for example, by adding text, adding to the image, changing colors, adding or deleting existing objects, rearranging the placement of elements of the raster image, etc., and these changes are detected.

At 210, the changes made to the raster image are rendered into another raster image, and in an embodiment, this raster image contains a set of pixels that correspond to the changes made to the raster image.

At 212, the modified raster image is transmitted to the server, where the modified raster image is combined with the original raster image into a new raster image. The frequency of communicating these changes may vary from reporting multiple changes per second to reporting every multiple seconds the collective change. According to an embodiment, this occurs after changes to the raster have been received by the service.

At 214, all clients participating in the shared raster image collaboration are notified by the server that changes have been made to their version of the raster image, and the new raster image as held by the server is transmitted to the clients. In an embodiment, all changes are processed by the service in the order they are received and modifications cannot be made while off-line, simplifying synchronization. In an embodiment, the individual clients request the new raster image to be transmitted to them.

Single Drawing Model Shared to Various Devices

According to an embodiment, a shared collaborative model for a complex document that may contain drawings, images, text, and/or video (herein referred to as a "drawing") is provided. While a raster image may be insufficient to describe such complex documents, a single drawing model based on a markup language for web pages, such as HTML, may be used to display the contents of a shared document on all devices, making the representation identical across a number of unlike devices. While HTML5 (as described, for example at "www-.whatwg.org/C," incorporated herein by reference) is used in the embodiments described herein, any similarly capable language may be used.

By using a web description/presentation technique, such as HTML or other such standardized visual description like Adobe Corporation's Flash or Microsoft's SilverLight, the approaches described herein provide an identical view of a complex document across a variety of rendering and modification platforms that is quick to display, efficient to store, and common to a wide array of devices and implementations.

While the following embodiments are discussed in the context of a touchscreen device on which a drawing may be created, edited and displayed, it should be understood that the techniques described herein are not so restricted and may be practiced on any device. As an example, where a touchscreen device is discussed, alternate input devices to devices may be envisioned, such as a trackpad or mouse.

Users interact with touchscreen devices by using a pointing device, such as a finger or stylus, to contact the touchscreen at a particular point (herein called a "touch-down" event). Attributes of this touch-down event, such as the precise location, are recorded. The user then raises the pointing device from the touchscreen (herein called a "touch-up" event) to complete a discrete interaction. The entire interaction between touch-down and touch-up is referred to as a "gesture."

Examples of these gestures are single presses, multiple presses (such as two or more fingers contacting the touchscreen at the same approximate time), swipes (movement of the pointing device on the touchscreen between touch-down and touch-up) and the like.

Attributes of each gesture (such as, but not limited to, the coordinates of the touch-down, the coordinates of the path taken by the pointing device on the touchscreen after touch-down, and the coordinates of the touch-up) are recorded, stored and transmitted to the local client and to a central repository such as a server (the "service"). A single gesture may also be sliced into smaller updates to the service, for example dividing a long 3 second gesture into 30 rapid 100 millisecond updates to make a drawing action appear smooth at a remote client. According to an embodiment, the gesture attributes are first sent to the local client's HTML5 interpreter, for example to render the curve of the gesture to the local device screen. According to an embodiment, the gesture attributes are then sent to the service to render the gesture as a line to the service's canvas, or master copy. While HTML5 is referred to in the context of the present example, it is understood that other means may be used to transmit attribute data necessary to describe a gesture so that it may be faithfully reproduced on multiple devices.

Figure 3:
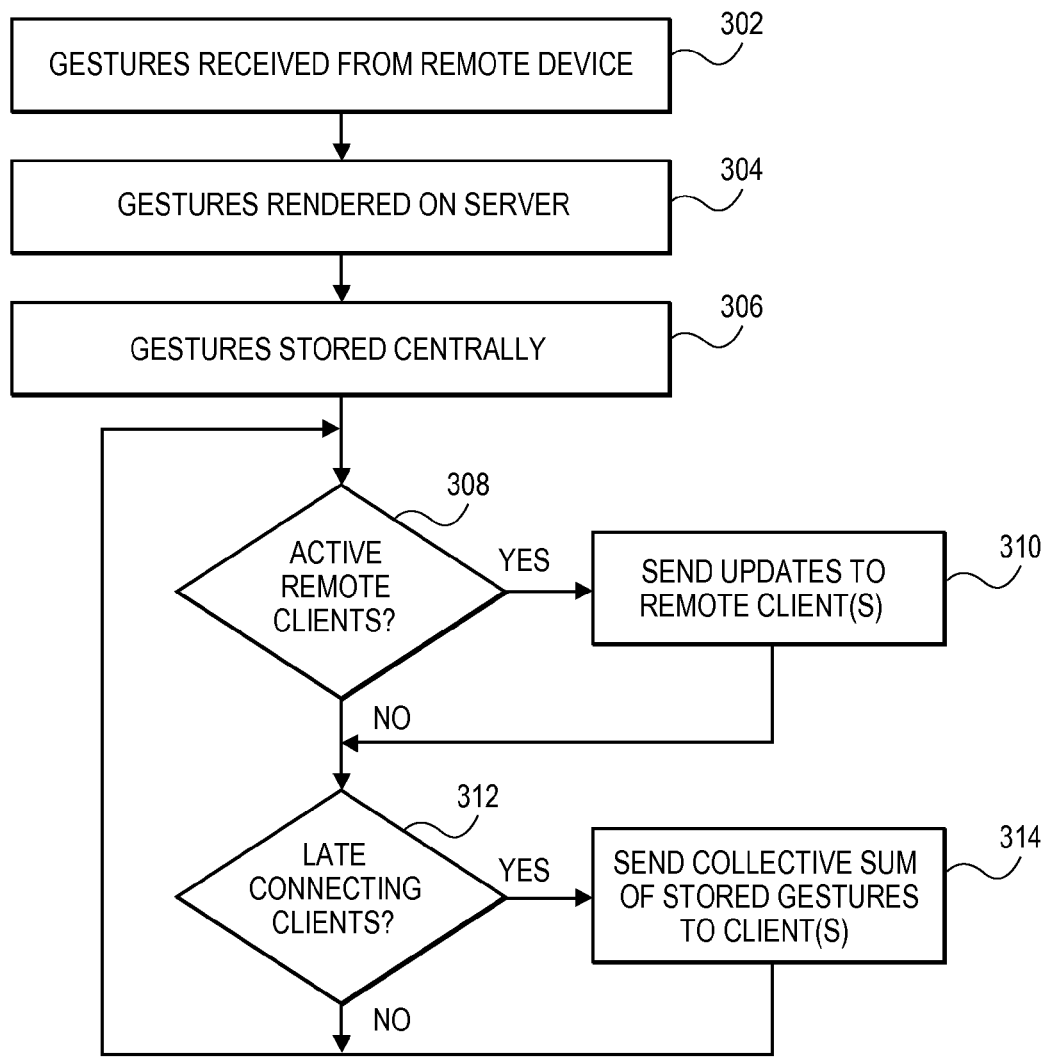
FIG. 3 is a flow diagram 300 illustrating an example approach for a single drawing model according to an embodiment.

FIG. 3 is a flow diagram 300 illustrating an example approach for a single drawing model according to an embodiment. In some implementations, the approach 300 can include fewer, additional and/or different operations. In other examples, only one or some subset of these operations may be included, as each operation may stand alone, or may be provided in some different order other than that shown in FIG. 3.

At 302, a gesture or set of gestures are received at a server, for example from a remote client device. According to an embodiment, the gesture is initiated and rendered on the client device immediately preceding being sent to the server. In an embodiment, a user is interacting with a client view of the content and making changes to that content through the addition, deletion, or modification of content. In this example, "content" is the drawing, media, or other user created information displayed on the touchscreen of a client device, e.g., an iPad; however, the term is not so limited and for example may apply to any display. All of these actions on the panel are captured as gestures and are both sent to the central server as well as rendered locally on a user's client device. In an embodiment, the panel contents may be saved between sessions of use, for example on the server. The panel can be used by a single person, closed, and later opened by another person without loss of data.

At 304, the gesture is rendered on the server, and at 306, the collective sum of all gestures received by the server are stored, for example on the server. In alternate embodiments, a subset of all gestures is stored. While the collective sum of all gestures comprises all gestures making up the document may be stored on the server, at any given point, only the gestures created at client devices since the last receipt of gestures by the server may be stored. In an embodiment, once the central server is in receipt of the new gestures, the gestures are rendered to the central panel resulting in a match to the remote client that initiated the changes.

At 308, a determination is made whether clients are in active communication (connected) with the server; for example, whether the clients are "online" and capable of sending and receiving gesture data. If active clients are identified, then at 310, the updated gesture data is transmitted to them. In an embodiment, updates of the changes are sent to all other currently connected remote clients resulting in each client having the most current stack of gestures. In an example, the updated gesture data comprises all the gestures created at client devices since the last receipt of gestures by the server.

At 312, a determination is made if there are any late-connecting clients (e.g., clients that were off line during previous changes) that are now back online. If so, at 314, the late-connecting clients are sent the collective sum of all previous gestures, which in an embodiment results in each late-connecting client having a matching data set to all other clients.

According to an embodiment, a gesture may be more than a line swept with a finger. Gestures may be other actions and instructions, which can include but are not necessarily limited to: typing blocks of text, erasing content, erasing the entire canvas, inviting other collaborators to participate in the document, and the act of creating a new canvas for interaction. Similar to the raster approach discussed above, each interaction (in this case, each gesture) is time-stamped and catalogued so that the centralized version of the document on the service remains the real-time super set of all of the various client gestures ("transactions").

This catalogued list of gestures also provides a diary, as it were, of the events that have occurred on the shared document. This diary can then be replayed in reverse to journal all of the actions or gestures that have transpired on a given panel. Various methods are envisioned for the communications between the client and the server, such as the script bundling protocol called JSON.

A standard polling method for updating content between the server and the clients is envisioned, although a technique such as "Long Polling" may be utilized, which provides more of an "as-needed" communications exchange between client and server rather than a constant every-other-second ping to check and verify status of the server and clients.

Standard polling methods may be employed to create communications between clients and servers in order to establish synchronized canvas gestures. Examples of polling techniques comprise:

Static Polling: A set period of time, usually short in duration (e.g., 2 seconds) at which the client contacts the central service to either deposit or request new gestures.

Long Polling: An open line communications method whereby the states are established of "connectedness" between the server and the client, after which communication only need occur when changes are available at either end of the communications line between client and server.

Web Sockets: Additional technology specifically to support web-based communications that enable live, as-needed, communications between client and server based on advanced web techniques for establishing an "always-on" communication link between client and server.

Because the vast majority of computing platforms support standards such as HTML5, JSON and polling, the approach of capturing, locally rendering, sending, remotely rendering, storing, and distributing document actions as gestures can re-image a shared complex document faithfully on any remote device. Using the native drawing routines of each device results in consistencies between renditions of each panel on the various platforms. By utilizing common rendering capabilities of each client device (for example, via HTML5) the approaches described herein provide consistent cross-platform common display results.

According to an embodiment, a system may be provided wherein one or more components or nodes are configured to perform all or a subset of the functionality. For example, one or more client devices (or modules or processes executing on the client device(s)) may be configured to capture a gesture, transmit data related to the gesture(s), render gestures, and receive data related to gestures. A server or similar computing device, or a module or process executing on the server, may be configured to receive and transmit data related to gestures, as well as process and store gesture data.

In an embodiment, peer to peer networking approaches may be utilized wherein no centralized server is involved.

Thumb Eraser

According to an embodiment, the ability to switch tools from one drawing mode, such as line drawing, to another mode, such as erasing, may be accomplished by algorithmically detecting the finger on the hand that is being used on a touch capable device.

Watch any person approach a white board and you will notice that people are accustomed to writing with a pen and erasing with their thumb. The broad surface of the thumb often naturally matches the character height of their written text. They could have grabbed an eraser, but for quick corrections, the switch of tools to simply using the thumb is beneficial.

In a digital environment, such as on a digital whiteboard or other touchscreen display device, currently there is no simple shortcut for switching tools in this fashion. A deliberate action is required to move from draw to erase. On a touch capable device this can mean switching between using one's finger as a pen and then a moment later as an eraser. This is further complicated when a toolbar is hidden, then creating 3 separate gestures for switching tools, and then 3 again to switch back. Moreover, while some applications allow the user to change the size of the eraser vis-a-vis the pen tool, this adds additional steps as well. All of these steps further distance the usage of the digital tablet from the ease of its analog sister, the traditional whiteboard.

When a touch gesture is made on a screen (or on a similar input device, such as a trackpad), rather than simply recording the central point of contact, a calculation is made that evaluates the overall shape of the contact point with the glass. This shape is analyzed to determine if the shape of contact is more characteristic of the tip of a finger or the broad side of a thumb. If a finger is detected, the mode can be set to one tool selection, such as line drawing, and if a thumb is detected, the mode can be set to an alternate tool, such as an eraser.

In an embodiment, mathematics of this analysis translate the "impact zone" to an "outlined shape" and then evaluate the dimensions of that outlined shape to categorically classify its attributes (such as height, width, and variation) as either fingertip (e.g., noticeably round) or thumb-side (e.g., noticeably oblong).

Figure 4:
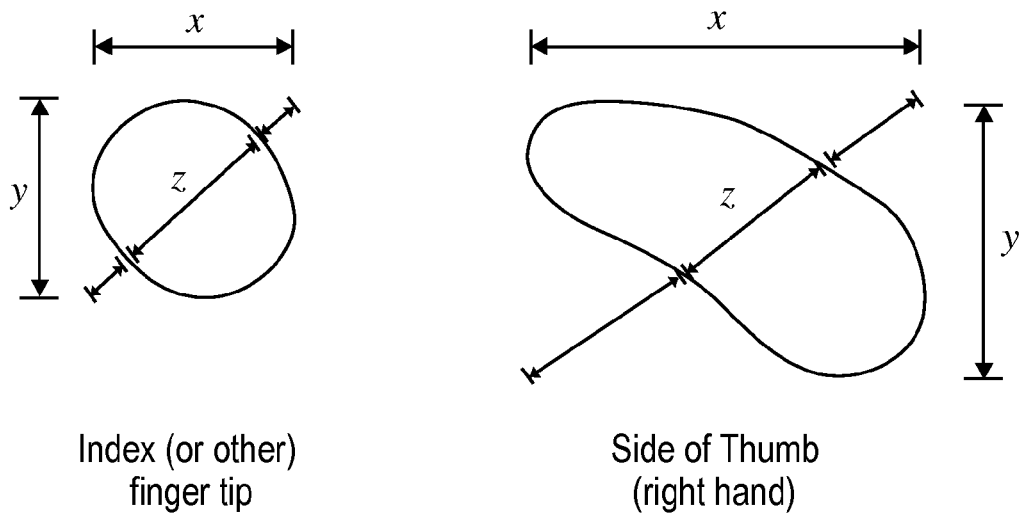
FIG. 4 is an illustration 400 of thumb impact detection according to an embodiment.

FIG. 4 is an illustration 400 of thumb impact detection according to an embodiment. In FIG. 4, the detection of a thumb impact may be determined by evaluating the shape of an "impact zone." The impact zone establishes an overall rectangle that encompasses the impact in x and y coordinates/dimensions. A theoretical diagonal line z is then drawn from the lower left to the upper right corner of the overall rectangle. This diagonal line is then evaluated vis-à-vis the initial impact zone to determine the percentage of the diagonal line that overlaps the impact zone. In an embodiment, the narrow nature of the side surface of the thumb will result in an overlap ratio that is less than, say, 50% of the length of the line, whereas a finger press will result in more than 50% of the diagonal line overlapping the impact zone.

In addition to changing the tool state, the analysis of the impact zone can be used to establish other characteristics of a tool, such as dimensions. Most pen tool or eraser tools on digital devices vary in their default size and shape, most commonly having the pen tool with a small circular shape and the eraser with a larger square or block shape. This technique includes approaches for using the analysis of the impact zone to also set the size and shape of the tool being selected.

The impact zone is converted to a simplified overall shape, which is then passed to the application interface software as the dimensions of the new tool on the canvas. In this way, for example, the broad shape of the side of a thumb and its coverage on the surface of the glass can be exactly mimicked in the shape of the eraser as it swipes through existing marks on the digital drawing.

Smart Symbols

In traditional note taking on paper or group collaborative efforts such as on a whiteboard, people often annotate text with shorthand "action symbols" that translate to actions or other contextual information related to the annotated text. For example, a double lined box around a name may indicate a "To Call" action item. Another symbol such as a double underline under text may indicate a "To-Do List" item.

In the process of personal or group note taking, most notes have the purpose of creating action within an organization's or individual's future. These actions can be listed and within a small number of actions the predominant social actions can be described. The contents of a group whiteboard are often riddled with circled items, called out names, assigned tasks, delegated responsibilities.

By determining a graphical vocabulary for these actions, these action symbols can provide a visual shorthand for post-processing written notes more quickly and effectively. On a digital note-taking and note sharing device, such as a touch-screen device like the iPad, these symbols can be used as the basis for actions by analyzing the contents of a drawn or written digital space, identifying action symbols and automatically executing associated actions. For example, emails can be sent, to-do lists updated, meetings arranged, and phone call contact numbers extracted and established, all as a powerful set of post-processing results based on markings left on the digital device.

According to an embodiment, image analysis of a stored raster that looks for specific unique symbols or glyphs may be used to signify the invocation of specific actions. Once the appropriate action has been determined, the content associated with the symbol can be communicated to a specific application for further processing. An envisioned end result is content from written notes is identified, refined, and routed to correct actions based on an associated symbol.

According to an embodiment, a glossary of "action symbols" is provided. This glossary may be predetermined or user-provided, as well as being editable. In an embodiment, new action symbols may be created and defined on-the-fly. In an embodiment, a unique and recognizable shape or symbol able to be written like any other character, but unique enough to be distinguishable from existing characters in standard Latin character sets or any other glyph set in use on the device, is established for each desired action.

According to an embodiment, a sample action symbol set may be as shown in FIG. 5, which is an illustration 500 of sample action symbols and their associated actions according to an embodiment.

Content is evaluated, either in real-time or on-demand, and action symbols are detected and recognized, as well as the content associated with the action. In an embodiment, different actions have different heuristics for identifying their associated content. For example, a "To-Call" action will be configured to find a name or phone number whereas a "To-Do" action is associated with longer single or list items. Visual aids, such as boxes around text or similar grouping context may also be used to enclose regions of content to be associated with a given action symbol. For example, a list of phone numbers may be enclosed with a box and the action symbol associated with a "To-Call" action item drawn nearby. Each phone number in the box will be identified and have the action performed on them. Associated content is then processed to prepare it prior to the action phase. For example, the content is digitally cleaned (e.g., cropped and contrast enhanced) and analyzed (recognized for handwriting).

Once an action symbol has been identified, the related action is invoked for that specific symbol. Each symbol may have an associated workflow. Scripts and automated routines may be utilized to execute a workflow based on the specific symbol that has been detected. For example, when a "To-Do" symbol is identified, the action that is invoked causes the associated content to be conveyed to the user's to-do list manager, such as an "App" on the user's iPad. A workflow may be a combination of scripts, custom code, or integration APIs to interface with other applications.

Cursor-Driven Interface for Layer Control

In traditional graphic design applications, a user may create complex documents with many elements stacked in what is commonly referred to as "z-order," meaning those objects with a lower z-order value are visually presented behind those objects with a higher z-order. Having many objects stacked in this manner causes difficulty in altering or rearranging the z-order of an object in one of these applications. Some approaches use menu commands such as "Bring to front" and "Send to back," as well as commands such as "Bring forward" and "Send backward." These commands may be issued in rapid succession on a selected object, often with the assistance of keyboard shortcuts, in order to change the stacking order of the object in the document.

According to an embodiment, a user interface approach for touch, mouse, and stylus devices that allows alteration of the current z-order based on graphical up and down movement and auto redisplay of layered objects is envisioned.

Figure 6:
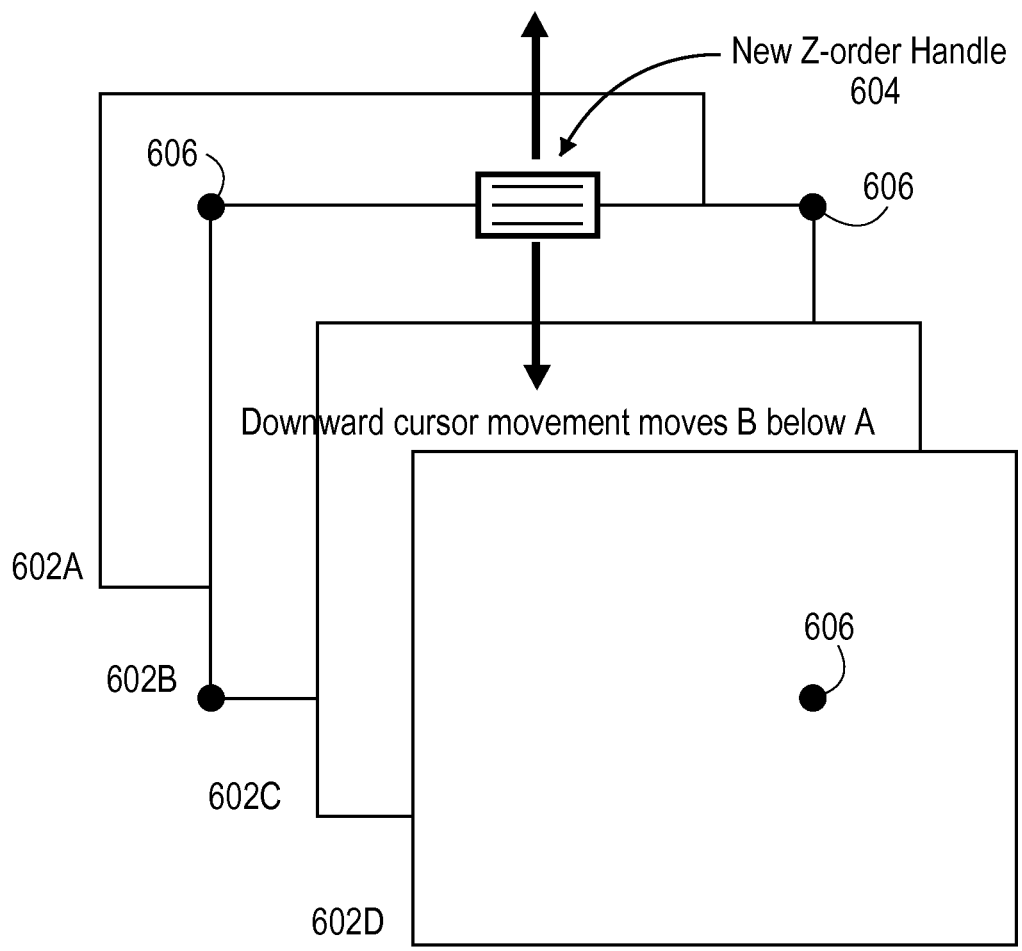
FIG. 6 is an illustration 600 of a cursor-driven interface according to an embodiment.

Referring to FIG. 6, which is an illustration 600 of a cursor-driven interface according to an embodiment, it is common in current computing environments, especially with regard to graphic design applications, to have multiple elements 602A-602D arranged in overlapping order. An example of elements 602A-602D could be four windows as drawn by the device operating system, or four layers in an illustration application, or four text blocks in a presentation application. The present techniques are not limited to any one particular kind of interface or document element.

In the example of FIG. 6, elements 602A-602D are square design elements in an illustration application. They are arranged in overlapping order such that element 602A is at the bottom, or "base" level. Element 602B is directly in front, or on top, of element 602A with no element in-between. Element 602C is in front, or on top, of elements 602A and element 602B, but directly in front of element 602B. Element 602D is in front, or on top, of elements 602A-602C, but directly in front of element 602C.

Element 602B is currently selected for manipulation, and it is common to have a selected element 602B display a set of handles 606, typically in the corners, in the bounding box of the selected element 602B. These handles 606 are typically used for sizing or moving the element 602B; sometimes also for rotating, shearing, or deleting.

According to an embodiment, a new handle behavior is provided, either by adding functionality to an existing handle state or by adding a new handle element. The example in FIG. 6 depicts a new handle 604 located at the middle of the top border of the bounding box 606 of the selected element 606B. This handle 604 can be dragged, for example with a mouse or finger, and as the dragging motion goes up or down, the z-order of the selected object 602B is commensurately raised and lowered in relation to other objects 602A-D in the document. When the desired z-order height is achieved, the cursor 604 may be released (e.g., mouse button released or touch/stylus raised) and the new z-order property is ascribed to the selected object 602B. This behavior may be applied to multiple objects at once in addition to singly selected objects.

Because stacks of objects within a complex document can become exceedingly deep, the migration through the z-order benefits from being non-linear. There are 3 highly used behaviors of z-order change and embodiments of the described interface implementation take this into account. Three common behaviors when altering z-order are to bring to front, send to back, and change the z-order by a small amount in the vicinity of the stack where the selected object is located. The physics of the control as presently described may be tuned to benefit these standard behaviors.

Figure 7A:
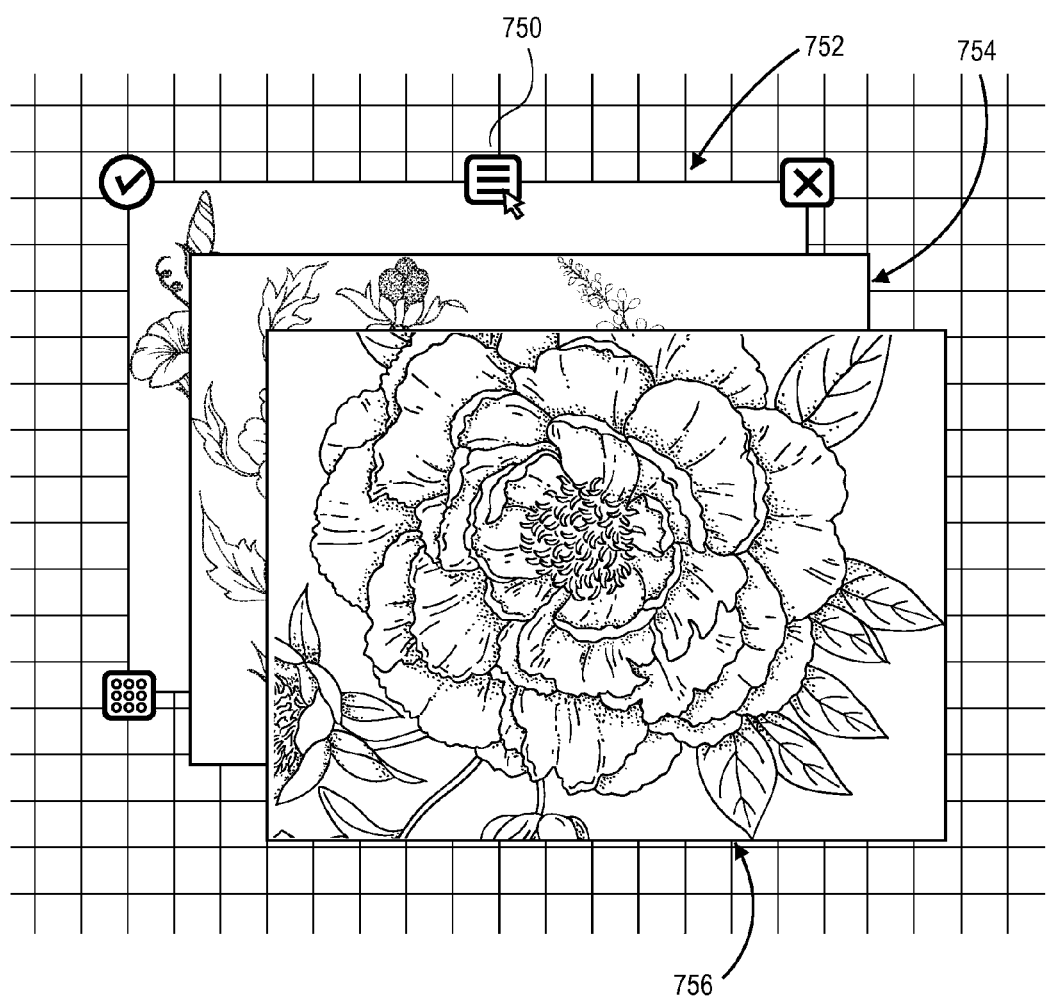
FIGS. 7A and 7B are illustrations 700, 702 of an example embodiment.
Figure 7B:
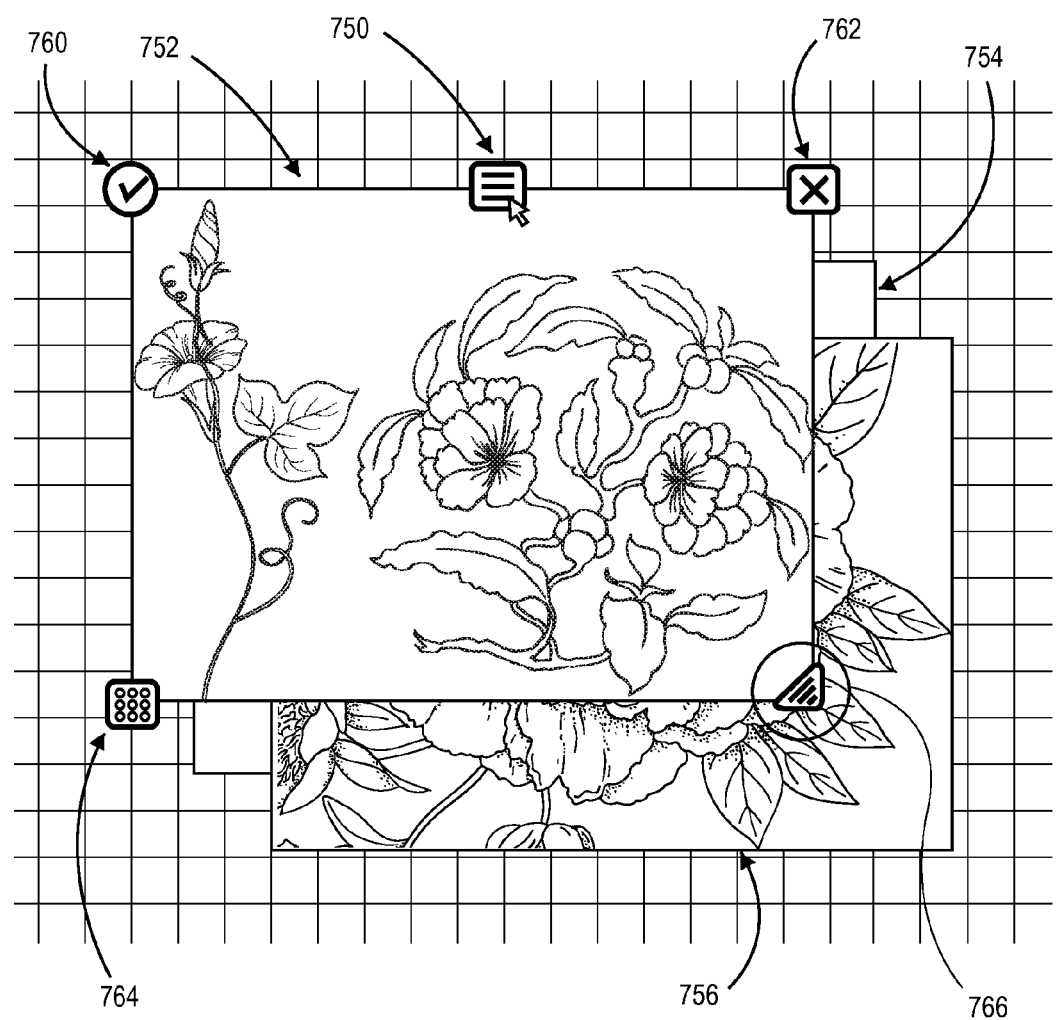

Referring to FIGS. 7A and 7B, which are illustrations 700, 702 of an example embodiment, in FIG. 7A a stack of pictures 752-756 are shown in a layered arrangement. The currently-active picture 752 is in the rearmost layer of the stack, and an example handle 750 as described earlier is shown.

Turning to FIG. 7B, which is an illustration of the example embodiment of FIG. 7A after a user has manipulated handle 750 is a manner which, in the example embodiment, is configured to alter the stack order of the currently-selected picture 752 from rearmost to frontmost in the layered arrangement. After the currently-selected picture 752 is so moved, it appears in front of the formerly frontmost picture 756 and formerly middle-placed picture 754 (as illustrated in FIG. 7A). Additional graphical interface elements may be provided in various embodiments, such as the previously described set of handles 706 in the corners of the currently-selected picture 752 being operable to perform certain actions. In the example embodiment of FIGS. 7A and 7B, a handle 760 may operate to "confirm" or finalize the stack manipulation or another action, depending on the embodiment. Another handle 762 may operate to "undo" the stack manipulation or another action, depending on the embodiment. Another handle 764 may operate to move the currently-selected item, while another handle 766 may operate to resize the currently-selected item.

Figure 8:
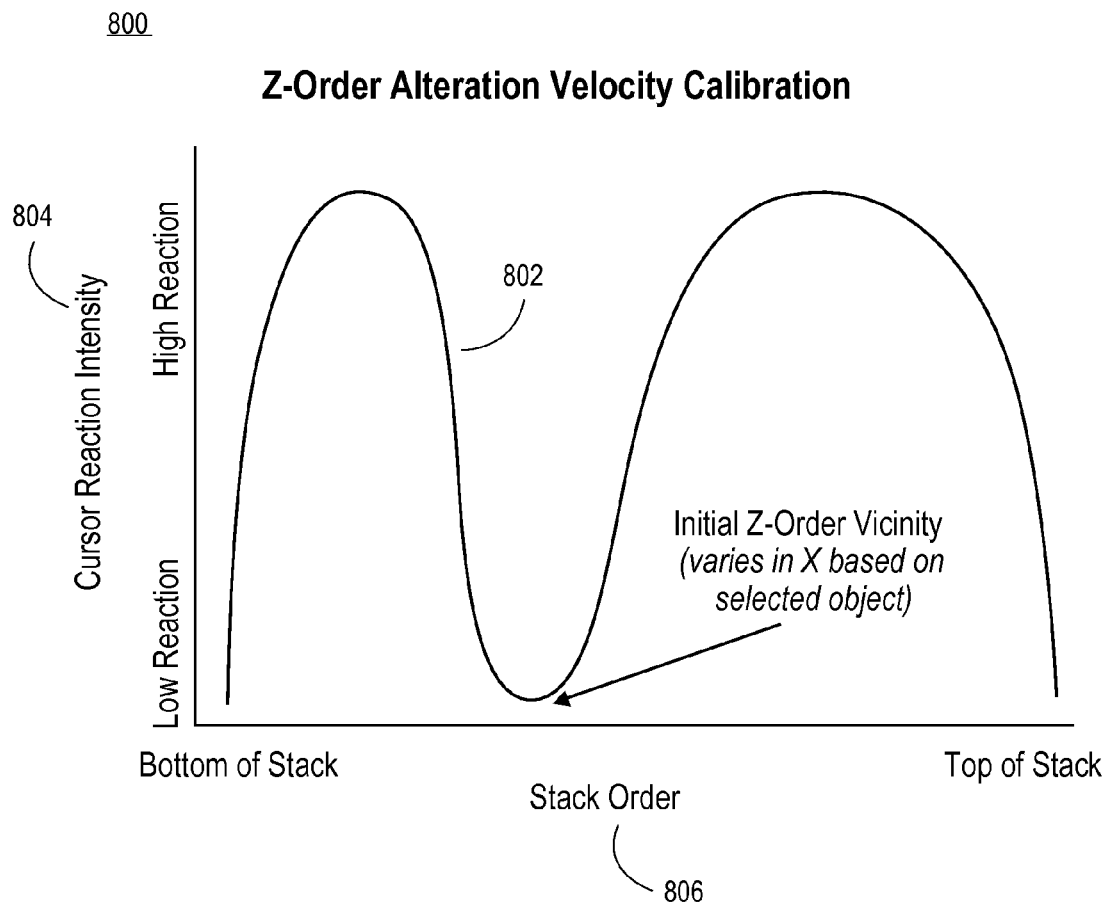
FIG. 8 is a graph 800 illustrating the reaction of the movement of the cursor in reference to what portion of the stack is being navigated, according to an embodiment.

Turning now to FIG. 8, which is a graph 800 illustrating the reaction of the movement of the cursor in reference to what portion of the stack is being navigated, according to an embodiment. Vertical axis 804 represents cursor reaction intensity from "low reaction" to "high reaction." In an embodiment, this corresponds to how rapidly the cursor movement will alter the z order placement of the object. Horizontal axis 806 corresponds to a stack order, from the bottom of the stack to the top of the stack. As one proceeds along the graphed line 802, the rate with which one is moved through the stack will vary based on the current stack location. Since very little cursor movement is available in the event of a small scroll bar being presented, varying degrees of response may be built into the cursor reaction.

In effect, the movement of the interface control will have a greater feeling of precision near the top, bottom, and initial z-order vicinity, and will rapidly move through the layers that are in regions of the stack that are less likely to be of interest to a user. In alternate embodiments, the speed at which the selected element or elements are moved through the stack may depend on other factors, such as the selected element or elements approaching either the bottom or top of the display order, or the proximity of the selected element or elements to their original place in the display order.

Bump Tool Selection

A current trend in software design is to offer as much of the screen real estate as possible to the document that is being worked on and to hide, as much as possible, the tools and options that are available to work on the document. This is in reaction to recent applications that clutter the display so badly with toolbars, ribbon bars, and status bars that the document has little space to be shown.

As a result, a difficulty presented is that with the tools hidden, changes from one tool to another become difficult and involve many steps of showing and hiding toolbars, etc.

New mobile touchscreen devices, such as the iPad, have accelerometers built into them that can detect motion and vibrations. While these components have been used to initiate simple step-wise actions such as "undoing" the most recent action, embodiments of the present approach enable complex tool selection through physical interaction with a device.

Figure 9:
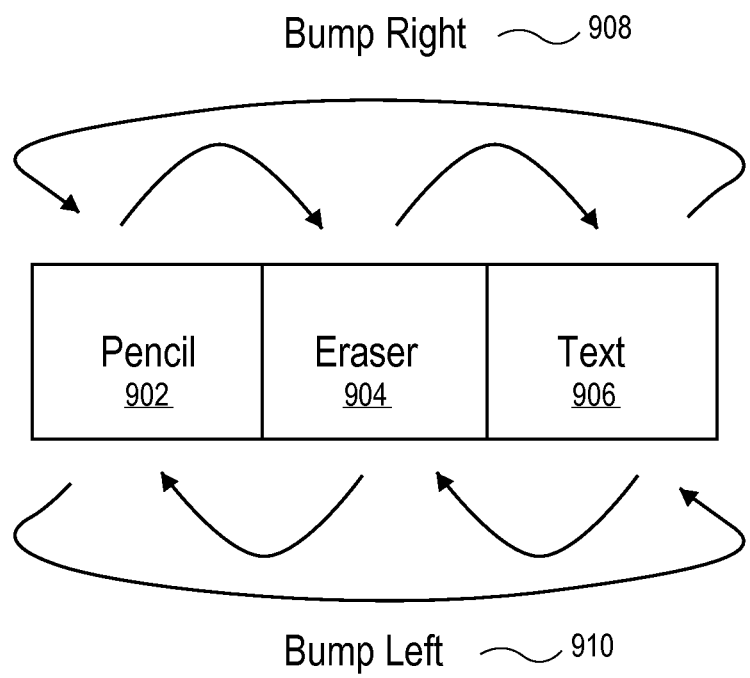
FIG. 9 is an illustration of tool selection in accordance with an embodiment.

Turning to FIG. 9, which is an illustration of tool selection in accordance with an embodiment, there are three tools 902-906 available to a user in this example, a pencil tool 902, an eraser tool 904 and a text input tool 906. A user may alternate a currently-selected tool through an available set of tools 902-906 by bumping the device on the left or right hand side in order to move the current tool selection to the left or right. In the example of FIG. 9, this allows the user to switch back and forth between the pencil 902, eraser 904, and text input 906 tools without having to unhide a toolbar or take any other action. For example, if the currently-selected tool is the pencil tool 902, a user may bump the device on the right side to switch to the eraser tool 904, and if the currently-selected tool is the eraser tool 904, a user may bump the device on the left side to switch to the pencil tool 902. The bumping may or may not be coordinated with the orientation of the device. In an embodiment, the change in tool selection may be displayed to the user for a brief moment to notify the user of the tool change. This display behavior may be automatic and temporary and not requiring any action by the user.

Figure 10:
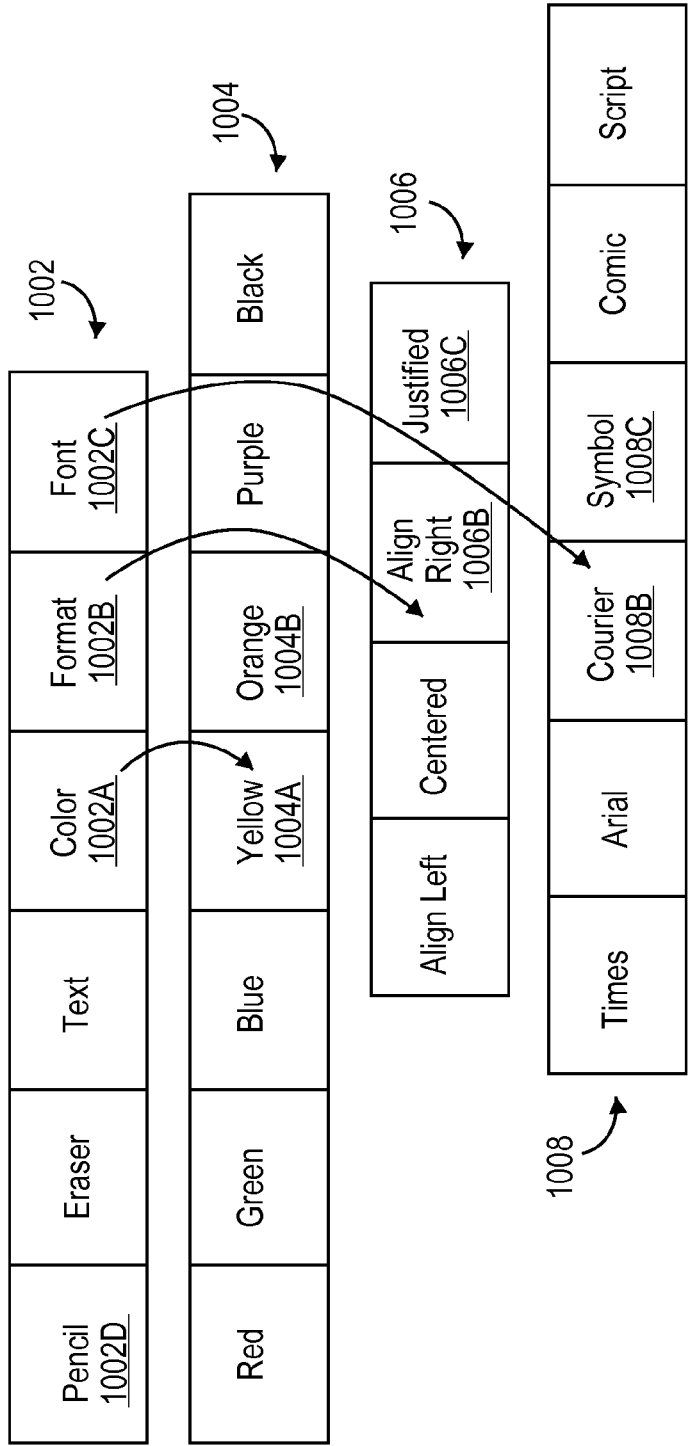
FIG. 10 is an illustration 1000 of tool selection in accordance with an embodiment.

Turning to FIG. 10, which is an illustration 1000 of tool selection in accordance with an embodiment, there are envisioned embodiments whereby a user bumps the top and bottom of the device to select different sets of tools or colors, thereby allowing the user to navigate an invisible grid of options based on their physical interactions with the device without the need to display any additional interface elements.

In the example embodiment of FIG. 10, a user has selected a word, for example in a word processing application, and has a "primary" group of tools 1002 available and several "secondary" settings available associated with the primary tools 1002. This is merely an example, as the techniques described herein may be used with any type of application wherein various objects may be assigned properties.

In the example of FIG. 10, the user has the Color tool 1002A currently selected, perhaps in response to a bump to a side of the device depending on an embodiment. In this case, having the Color tool 1002A selected, if the user were to bump the device on the right side, the tool would switch to the Format tool 1002B as discussed with respect to the embodiments related to FIG. 9. If the user were to bump the device on the right side again, the tool would switch to the Font tool 1002C.

If the user has the Color tool 1002A selected and bumps the bottom of the device (which may or may not be dependent on device orientation), the user will begin to navigate the secondary settings applicable to the Color tool 1002A, in this case being various available colors 1004. The initial bump as previously described would activate the "yellow" color 1004 and apply it to the selected text (not pictured). If the user were to bump the device on the right side at this point, the color selection would switch to the "orange" color 1004B and apply that color to the selected text.

In the example of FIG. 10, the user has the Format tool 1002B currently selected, perhaps in response to a bump to a side of the device depending on an embodiment. In this case, having the Format tool 1002B selected, if the user were to bump the device on the right side, the tool would switch to the Font tool 1002C as discussed with respect to the embodiments related to FIG. 9. If the user were to bump the device on the right side again, the tool would switch to the Pencil tool 1002D.

If the user has the Format tool 1002B selected and bumps the bottom of the device (which may or may not be dependent on device orientation), the user will begin to navigate the secondary settings applicable to the Format tool 1002B, in this case being various available text alignments 1006. The color settings 1004 of the previous example would not be accessed because the Format tool 1002B does not accept "color" as a property; however, this predetermined action may be changed, for example, by a user or a software update. The initial bump as previously described would activate the "align right" property 1006B and apply it to the selected text (not pictured). If the user were to bump the device on the right side at this point, the formatting selection property would switch to the "justified" property 1006C and apply that property to the selected text. In this manner, various tools may be selected with physical interaction with a device, and related properties applicable to particular tools may be navigated with subsequent physical interaction with a device, thereby saving a user the need to access multiple, perhaps nested, user interface elements.

Alternate Implementations

In the specification, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc., in a computer program. When a process corresponds to a function, its termination corresponds to a return of the function to the calling function or a main function.

Aspects of the systems and methods described below may be operable on any type of general purpose computer system or computing device, including, but not limited to, a desktop, laptop, notebook, tablet or mobile device. The term "mobile device" includes, but is not limited to, a wireless device, a mobile phone, a mobile communication device, a user communication device, personal digital assistant, mobile hand-held computer, a laptop computer, an electronic book reader and reading devices capable of reading electronic contents and/or other types of mobile devices typically carried by individuals and/or having some form of communication capabilities (e.g., wireless, infrared, short-range radio, etc.).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

In the foregoing, a storage medium may represent one or more devices for storing data, including read-only memory (ROM), random access memory (RAM), magnetic disk storage mediums, optical storage mediums, flash memory devices and/or other machine readable mediums for storing information. The terms "machine readable medium" and "computer readable medium" include, but are not limited to portable or fixed storage devices, optical storage devices, and/or various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a sub-program, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, circuit, and/or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Example embodiments may be implemented in digital electronic circuitry, or in computer hardware, firmware, or software, or in combinations thereof. Example embodiments may be implemented using a computer program product (e.g., a computer program tangibly embodied in an information carrier in a machine-readable medium) for execution by, or to control the operation of, data processing apparatus (e.g., a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communications network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a field programmable gate array (FPGA) or an application-specific integrated circuit (ASIC)).

The computing system can include clients and servers. While a client may comprise a server and vice versa, a client and server are generally remote from each other and typically interact through a communication network. The relationship of client and server arises by virtue of computer programs running on their respective computers and having a client-server relationship to each other. In embodiments deploying a programmable computing system, it will be appreciated that both hardware and software architectures may be considered. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set forth hardware (e.g., machine) and software architectures that may be deployed in various example embodiments.

One or more of the components and functions illustrated the figures may be rearranged and/or combined into a single component or embodied in several components without departing from the invention. Additional elements or components may also be added without departing from the invention. Additionally, the features described herein may be implemented in software, hardware, as a business method, and/or combination thereof.

While certain exemplary embodiments have been described and shown in the accompanying drawings, it is to be understood that such embodiments are merely illustrative of and not restrictive on the broad invention, having been presented by way of example only, and that this invention is not be limited to the specific constructions and arrangements shown and described, since various other modifications may occur to those ordinarily skilled in the art.

In the foregoing specification, example embodiments have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," and so forth are used merely as labels and are not intended to impose numerical requirements on their objects.

The Abstract of the Disclosure is provided to comply with 37 C.F.R. §1.72(b), requiring an abstract that will allow the reader to quickly ascertain the nature of the technical disclosure. The Abstract is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Hardware Mechanisms

Figure 11:
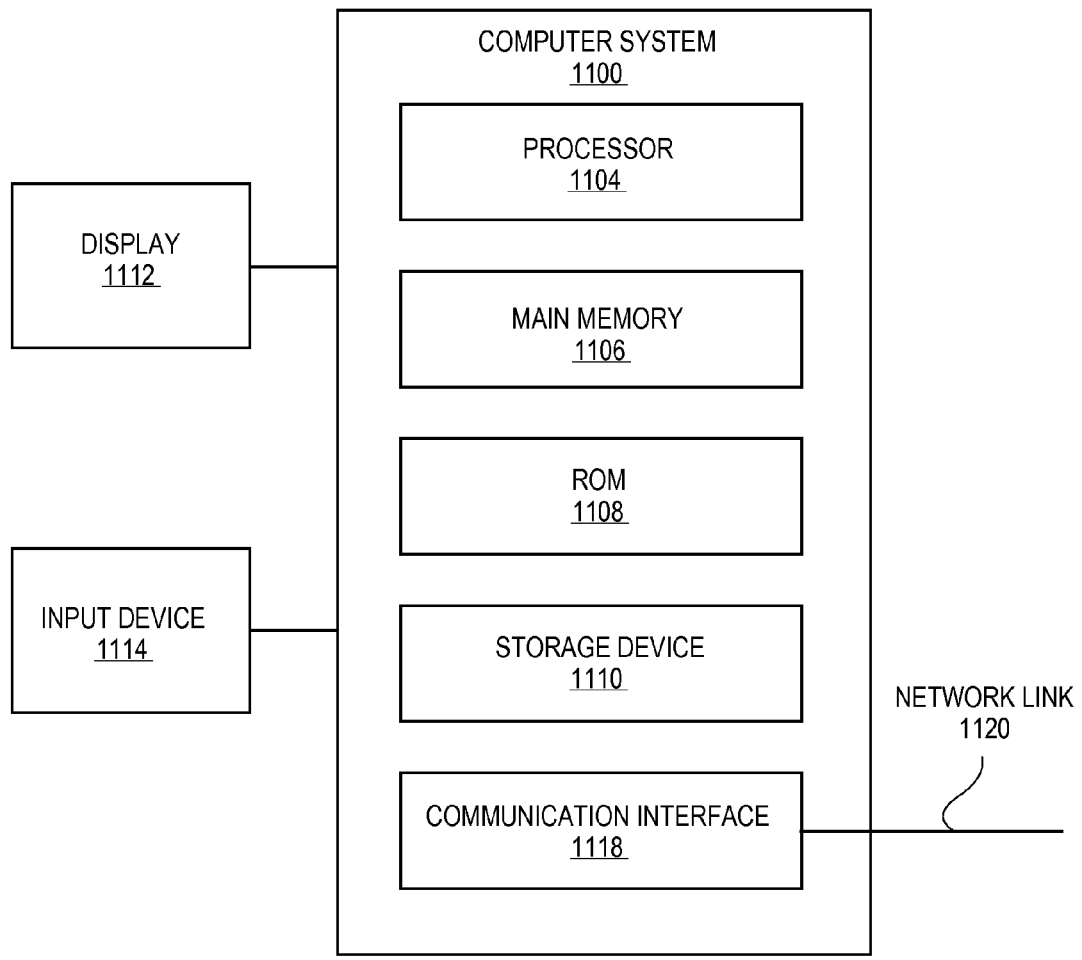
FIG. 11 is a block diagram that illustrates a computer system 1100 upon which an embodiment of the invention may be implemented.

Embodiments of the above-described approaches can be implemented on a platform such as described in FIG. 11.

FIG. 11 is a block diagram that illustrates a computer system 1100 upon which an embodiment of the invention may be implemented. In an embodiment, computer system 1100 includes processor 1104, main memory 1106, ROM 1108, storage device 1110, and communication interface 1118. Computer system 1100 includes at least one processor 1104 for processing information. Computer system 1100 also includes a main memory 1106, such as a random access memory (RAM) or other dynamic storage device, for storing information and instructions to be executed by processor 1104. Main memory 1106 also may be used for storing temporary variables or other intermediate information during execution of instructions to be executed by processor 1104. Computer system 1100 further includes a read only memory (ROM) 1108 or other static storage device for storing static information and instructions for processor 1104. A storage device 1110, such as a magnetic disk or optical disk, is provided for storing information and instructions.

Computer system 1100 may be coupled to a display 1112, such as a cathode ray tube (CRT), a LCD monitor, and a television set, for displaying information to a user. An input device 1114, including alphanumeric and other keys, is coupled to computer system 1100 for communicating information and command selections to processor 1104. Other non-limiting, illustrative examples of input device 1114 include a mouse, a trackball, or cursor direction keys for communicating direction information and command selections to processor 1104 and for controlling cursor movement on display 1112. While only one input device 1114 is depicted in FIG. 11, embodiments of the invention may include any number of input devices 1114 coupled to computer system 1100.

Embodiments of the invention are related to the use of computer system 1100 for implementing the techniques described herein. According to one embodiment of the invention, those techniques are performed by computer system 1100 in response to processor 1104 executing one or more sequences of one or more instructions contained in main memory 1106. Such instructions may be read into main memory 1106 from another machine-readable medium, such as storage device 1110. Execution of the sequences of instructions contained in main memory 1106 causes processor 1104 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 1104 for execution. Such a medium may take many forms, including but not limited to, non-volatile media and volatile media. Non-volatile media includes, for example, optical or magnetic disks, such as storage device 1110. Volatile media includes dynamic memory, such as main memory 1106.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a network link 1120 to computer system 1100.

Communication interface 1118 provides a two-way data communication coupling to a network link 1120 that is connected to a local network. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through a local network to a host computer or to data equipment operated by an Internet Service Provider (ISP).

Computer system 1100 can send messages and receive data, including program code, through the network(s), network link 1120 and communication interface 1118. For example, a server might transmit a requested code for an application program through the Internet, a local ISP, a local network, subsequently to communication interface 1118. The received code may be executed by processor 1104 as it is received, and/or stored in storage device 1110, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A computer-implemented method for layer control, comprising:
   under control of one or more computer systems configured with executable instructions:
   causing a visual display of a plurality of elements stacked in a display order, the display order having a frontmost element and a rearmost element of the plurality of elements;
   receiving an indication of a selection of a first element of the plurality of elements;
   displaying, in response to receiving the indication, an interface element associated with the first element, the interface element visually contacting at least a portion of the first element;
   determining a first relative position in the display order of the first element to each of the plurality of elements and a second relative position in the display order of the first element to the frontmost element and the rearmost element;
   receiving input associated with the interface element, the input comprising a dragging motion in a first direction;
   determining, in response to receiving the input, a new display order of the first element in the plurality of elements, the new display order of the first element in relation to the plurality of elements being determined based at least in part on the first direction;
   modifying the visual display of the plurality of elements to reflect the new display order, the first element visually moving at a first speed through the plurality of elements toward the rearmost element or the frontmost element based on the first direction, the first speed being based on the first relative position and the second relative position;
   determining, based on the new display order, a new first relative position in the display order of the first element to the plurality of elements and a new second relative position of the first element to the frontmost element and the rearmost element;
   determining that the input associated with the interface element is still being received;
   determining, in response to determining that the input associated with the interface element is still being received, a modified new display order of the first element in the plurality of elements;
   modifying the visual display of the plurality of elements to reflect the modified new display order, the first element visually moving at a second speed through the plurality of elements toward the rearmost element or the frontmost element based on the first direction, the second speed being different from the first speed and being based on the first new relative position and the new second relative position.

2. The method of claim 1, further comprising:
   determining a speed at which the interface element is being dragged; and
   adjusting the modifying the visual display of the plurality of elements based on the speed at which the interface element is being dragged.

3. The method of claim 2, wherein a speed at which the visual display of the plurality of elements is modified is based upon a proximity of the first element to either a bottom or top of the display order.

4. The method of claim 3, wherein a speed at which the visual display of the plurality of elements is modified slows down as the first element approaches either the bottom or top of the display order.

5. The method of claim 2, wherein the speed at which the visual display of the plurality of elements is modified based upon a proximity of the first element to its original place in the display order.

6. The method of claim 1, wherein the first element comprises multiple elements.

7. The method of claim 1, wherein the interface element comprises an existing handle.

8. A non-transitory computer-readable storage medium including instructions that, when executed by a processor, cause the processor to:
   cause a visual display of a plurality of elements stacked in a display order, the display order having a frontmost element and a rearmost element of the plurality of elements;
   receive an indication of a selection of a first element of the plurality of elements;
   cause, in response to receiving the indication, a display of an interface element associated with the first element, the interface element visually contacting at least a portion of the first element;
   determine a first relative position in the display order of the first element to each of the plurality of elements and a second relative position in the display order of the first element to the frontmost element and the rearmost element;
   receive input associated with the interface element, the input comprising a dragging motion in a first direction;
   determine, in response to receiving the input, a new display order of the first element in the plurality of elements, the new display order of the first element in relation to the plurality of elements being determined based at least in part on the first direction;
   modify the visual display of the plurality of elements to reflect the new display order, the first element visually moving at a first speed through the plurality of elements toward the rearmost element or the frontmost element based on the first direction, the first speed being based on the first relative position and the second relative position;

determine, based on the new display order, a new first relative position in the display order of the first element to the plurality of elements and a new second relative position of the first element to the frontmost element and the rearmost element;

determine that the input associated with the interface element is still being received;

determine, in response to determining that the input associated with the interface element is still being received, a modified new display order of the first element in the plurality of elements;

modify the visual display of the plurality of elements to reflect the modified new display order, the first element visually moving at a second speed through the plurality of elements toward the rearmost element or the frontmost element based on the first direction, the second speed being different from the first speed and being based on the first new relative position and the new second relative position.

9. The non-transitory computer-readable storage medium of claim 8, wherein the instructions further cause the processor to:

determine a speed at which the interface element is being adjusted; and adjust the modifying the visual display of the plurality of elements based on the speed at which the interface element is being dragged.

10. The non-transitory computer-readable storage medium of claim 9, wherein a speed at which the visual display of the plurality of elements is modified is based upon a proximity of the first element to either a bottom or top of the display order.

11. The non-transitory computer-readable storage medium of claim 10, wherein a speed at which the visual display of the plurality of elements is modified slows down as the first element approaches either the bottom or top of the display order.

12. The non-transitory computer-readable storage medium of claim 9, wherein the speed at which the visual display of the plurality of elements is modified based upon a proximity of the first element to its original place in the display order.

13. The non-transitory computer-readable storage medium of claim 8, wherein the first element comprises multiple elements.

14. The non-transitory computer-readable storage medium of claim 8, wherein the interface element comprises an existing handle.

15. A computing system for layer control, comprising:
at least one processor; and
memory storing instructions that, when executed by the at least one processor, cause the computing system to:
cause a visual display of a plurality of elements stacked in a display order, the display order having a frontmost element and a rearmost element of the plurality of elements;
receive an indication of a selection of a first element of the plurality of elements;

cause, in response to receiving the indication, a display of an interface element associated with the first element, the interface element visually contacting at least a portion of the first element;

determine a first relative position in the display order of the first element to each of the plurality of elements and a second relative position in the display order of the first element to the frontmost element and the rearmost element;

receive input associated with the interface element, the input comprising a dragging motion in a first direction;

determine, in response to receiving the input, a new the display order of the first element in the plurality of elements, the new display order of the first element in relation to the plurality of elements being determined based at least in part on the first direction;

modify the visual display of the plurality of elements to reflect the new display order, the first element visually moving at a first speed through the plurality of elements toward the rearmost element or the frontmost element based on the first direction, the first speed being based on the first relative position and the second relative position;

determine, based on the new display order, a new first relative position in the display order of the first element to the plurality of elements and a new second relative position of the first element to the frontmost element and the rearmost element;

determine that the input associated with the interface element is still being received;

determine, in response to determining that the input associated with the interface element is still being received, a modified new display order of the first element in the plurality of elements;

modify the visual display of the plurality of elements to reflect the modified new display order, the first element visually moving at a second speed through the plurality of elements toward the rearmost element or the frontmost element based on the first direction, the second speed being different from the first speed and being based on the first new relative position and the new second relative position.

16. The system of claim 15, further comprising:
determine a speed at which the interface element is being adjusted; and
adjust the modifying the visual display of the plurality of elements based on the speed at which the interface element is being dragged.

17. The system of claim 16, wherein a speed at which the visual display of the plurality of elements is modified is based upon a proximity of the first element to either a bottom or top of the display order.

18. The system of claim 17, wherein a speed at which the visual display of the plurality of elements slows down as the first element approaches either the bottom or top of the display order.

19. The system of claim 16, wherein the speed at which the visual display of the plurality of elements is modified based upon a proximity of the first element to its original place in the display order.

20. The system of claim 15, wherein the first element comprises multiple elements.

* * * * *